United States Patent [19]
Wang

[11] Patent Number: 5,590,473
[45] Date of Patent: Jan. 7, 1997

[54] BOW SAW

[76] Inventor: Kuang-Pin Wang, No. 425, Ta-Tun 4th Street, Taichung, Taiwan

[21] Appl. No.: 631,016

[22] Filed: Apr. 12, 1996

[51] Int. Cl.$^6$ .......................... B23D 51/03; B27B 21/02
[52] U.S. Cl. ................... 30/512; 30/506; 30/513
[58] Field of Search .................... 30/166.3, 506, 30/507, 512, 513, 514, 517

[56] References Cited

U.S. PATENT DOCUMENTS

| | | | |
|---|---|---|---|
| 2,651,341 | 9/1953 | Hammarstrom | 30/513 |
| 3,149,652 | 9/1964 | Swenson | 30/513 |
| 3,245,445 | 4/1966 | Herman et al. | 30/513 |
| 3,339,602 | 9/1967 | Wilson | 30/512 |
| 3,905,409 | 9/1975 | Bradley | 30/512 |
| 4,637,141 | 1/1987 | Allen | 30/512 |

*Primary Examiner*—Hwei-Siu Payer
*Attorney, Agent, or Firm*—Morton J. Rosenberg; David I. Klein

[57] ABSTRACT

A bow saw includes a saw blade seat, a handle and at least one saw blade. The handle is pivotally connected with one end of the saw blade seat. The saw blade seat axially extends into one end of the handle by a certain length. The saw blade pivotally connected with the other end of the saw blade seat. And, each saw blade can be rotated out through an opening of the saw blade seat to be engaged with the other end of the handle so as to form the bow saw in a working state. Therefore, the folding or unfolding operations can be quickly and safely performed and the bow saw can be held with a comfortable feeling.

8 Claims, 9 Drawing Sheets

BOW SAW

BACKGROUND OF THE INVENTION

The present invention relates to a bow saw which can be held with a comfortable feeling and the saw can be easily and quickly folded or unfolded.

FIGS. 1 and 2 show a conventional bow saw. It includes a saw blade seat 11, a handle 12 and a saw blade 13. The saw blade seat 11 can be received in the handle 12 for storage. However, prior to folding of the bow saw, the nut 14 must be released first. Therefore, it is uneasy to fold or unfold the bow saw. Also, the saw blade 13 is secured by means of tightening the nut 14. This is quite time-consuming.

FIGS. 3 and 4 show another conventional bow saw. This kind of bow saw includes a saw blade seat 21, a handle 22, a shifting body 23 and a saw blade 24. Such bow saw can be easily folded or unfolded by means of the pivotally connected handle 22 and saw blade seat 21. However, the handle 22 is formed with a channel 221 for receiving the saw blade seat 21 and the channel 221 is defined by two lateral thin walls. Such thin walls will cause some disadvantages such as it is difficult to hold the bow saw and the holding for a user is uncomfortable.

SUMMARY OF THE INVENTION

It is therefore a primary object of the present invention to provide a bow saw including a saw blade seat and a handle pivotally connected therewith. A section of the saw blade seat can be received in the handle in a folding state. Alternatively, the handle can be pulled out and rotated by 90 degrees so that the bow saw is unfolded as a working state. The folding or unfolding operations can be quickly and safely performed and the bow saw can be held with a comfortable feeling.

It is a further object of the present invention to provide the above bow saw in which the saw blade seat serves to receive at least one saw blades. Thus, a user can be conveniently selected one saw blade he or she needs.

The present invention can be best understood through the following description and accompanying drawings, wherein:

DETAILED DESCRIPTION OF THE PREFERRED EMBODIMENTS

Figure 1:
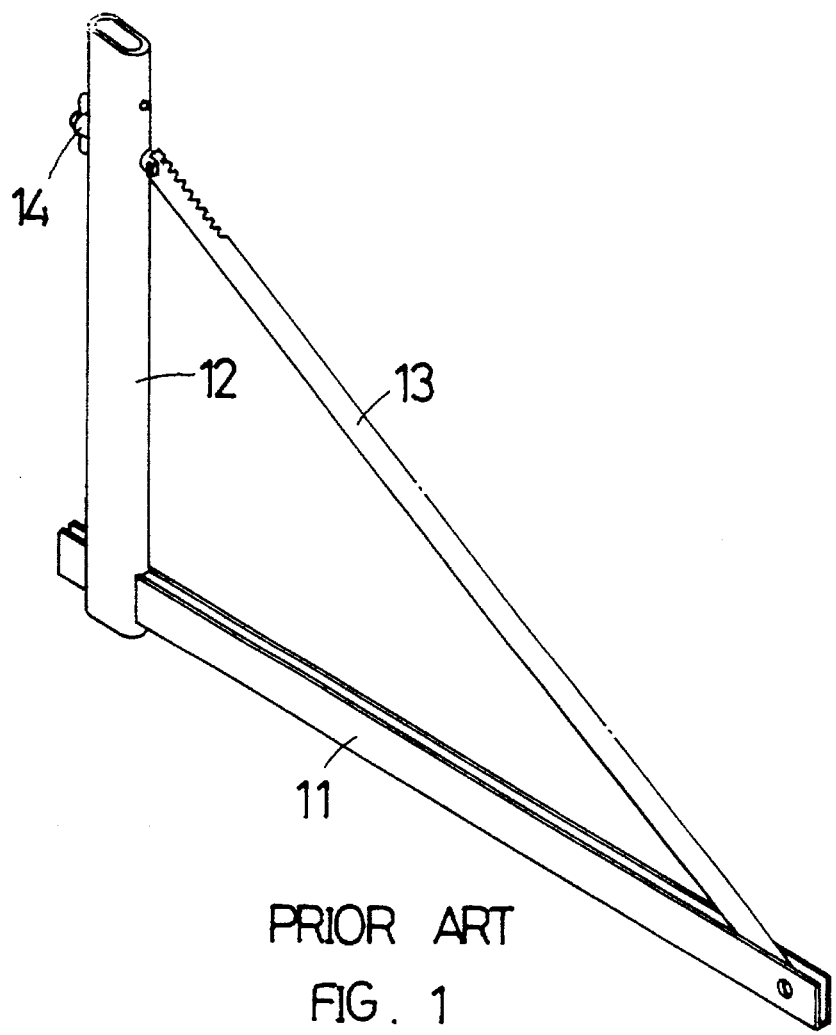
FIG. 1 is a perspective view of a conventional bow saw in an unfolded state.
Figure 2:
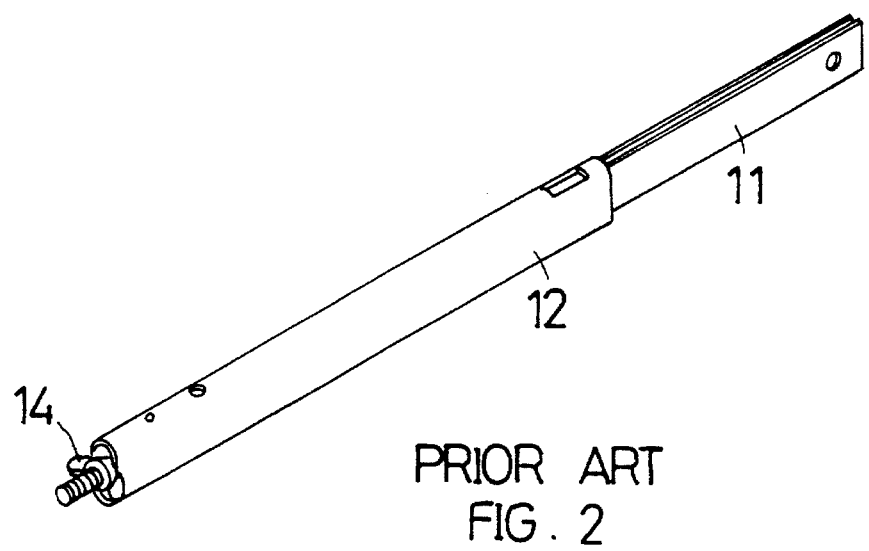
FIG. 2 is a perspective view of the bow saw of FIG. 1 in a folded state.
Figure 3:
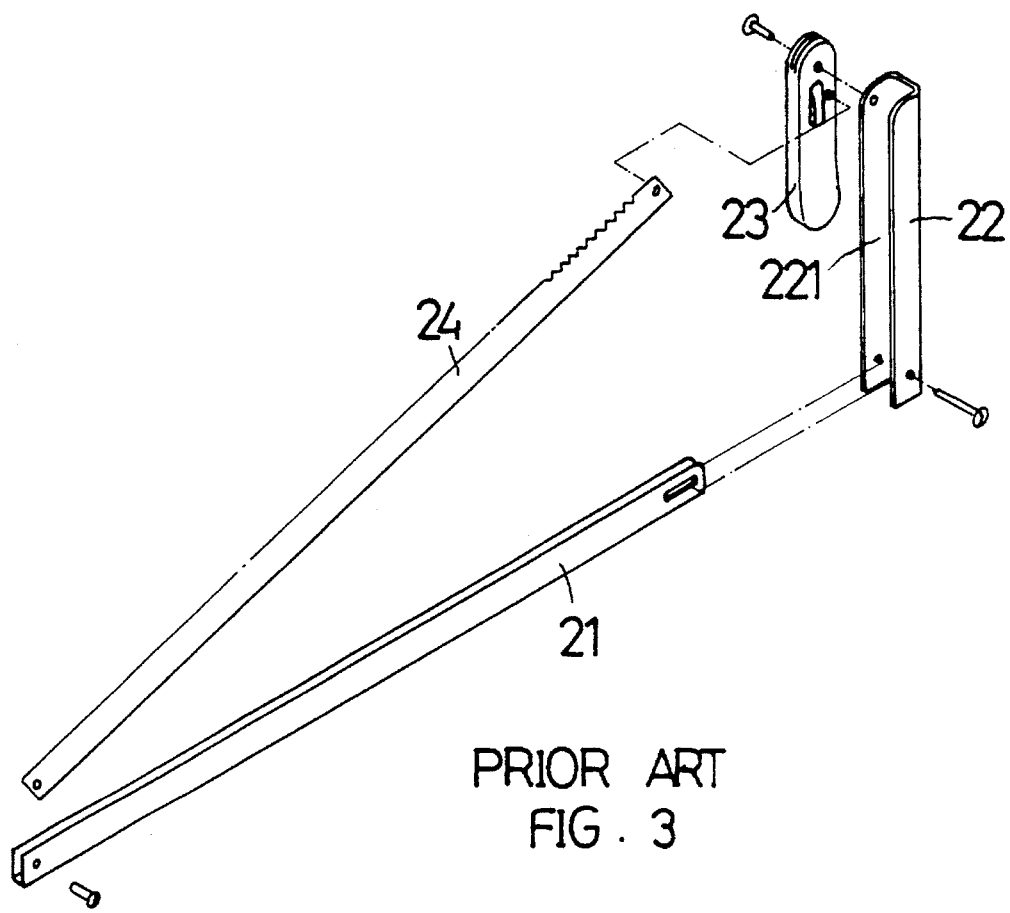
FIG. 3 is a perspective exploded view of another conventional bow saw.
Figure 4:
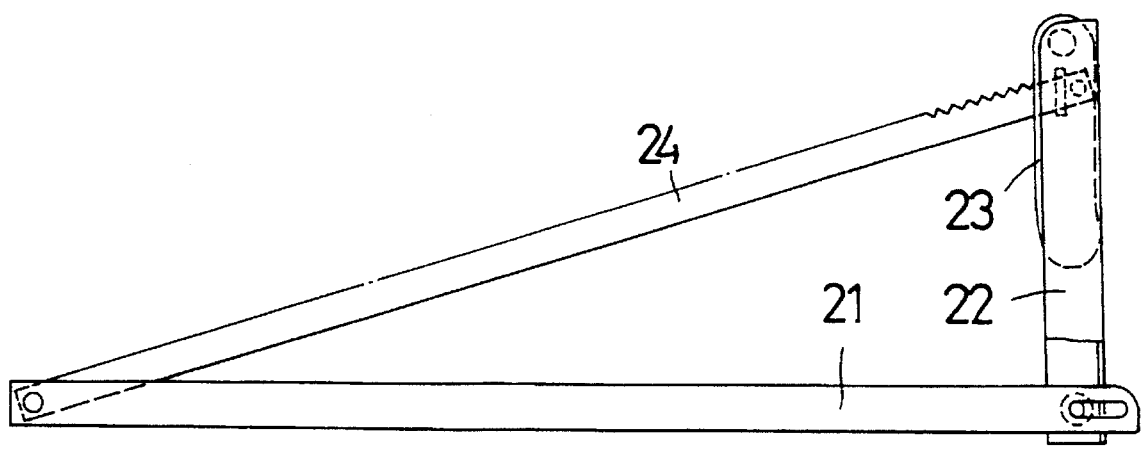
FIG. 4 is a side view of the bow saw of FIG. 3 in an unfolded state.
Figure 5:
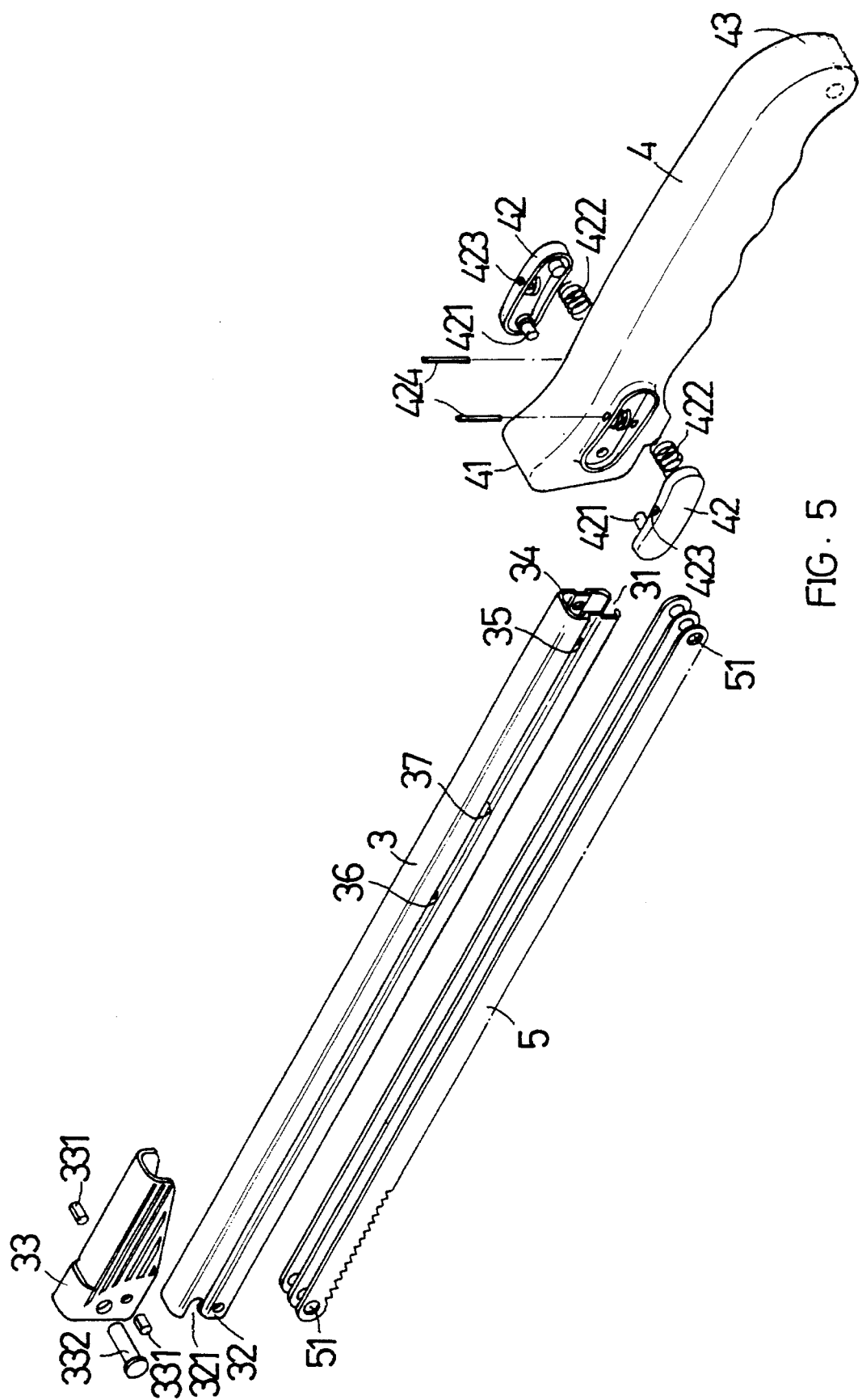
FIG. 5 is a perspective exploded view of a first embodiment of the present invention.

Please refer to FIG. 5. According to a first embodiment of the present invention, the bow saw includes a saw blade seat 3, a handle 4 and at least one saw blade 5.

The saw blade seat 3 is formed with a longitudinal channel having an opening 31 on bottom side of the saw blade seat 3. An eccentrically rotary cover 33 is pivotally connected with a first end 32 of the saw blade seat 3 by a pivot shaft 331. In this preferred embodiment as shown in FIG. 5, there are three saw blades 5. Each saw blade 5 is pivotally connected with the rotary cover 33 by a pivot pin 332. The pivot pin 332 is spaced from the pivot shaft 331 by a certain distance. The first end 32 of the saw blade seat 3 is disposed with an arch notch 321 for the pivot pin 332 to insert therein. The free end of the saw blade 5 can be rotated out of the opening 31. The saw blade seat 3 has a second end 34 distal from the rotary cover 33. The second end 34 is formed with a first locating hole 35. A second locating hole 36 is formed on the saw blade seat 3 and spaced from the first locating hole 35 by a length approximately equal to the length of the handle 4. A longitudinal slide channel 37 is formed between the first and second locating holes 35, 36 for reinforcing the structure of the saw blade seat 3.

Figure 7:
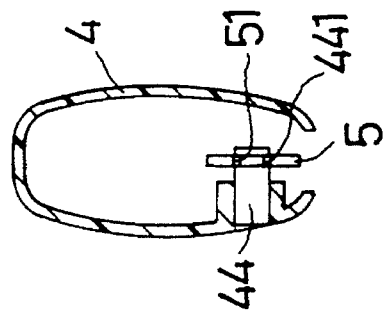
FIG. 7 is a sectional view showing the second end of the handle of the embodiment of FIG. 6.

The handle 4 is substantially an elongated hollow tube formed with waved external surface for easy grip by a user. A first end 41 of the handle 4 is open, whereby the second end 34 of the saw blade seat 3 can be axially extended thereinto by a redetermined length. A locating member 42 is disposed near the first end 41 of the handle 4. In this embodiment, the locating member 42 is a pressing button having a first end formed with a locating stopper block 421 and a second end disposed with a resilient body 422. The middle section of the pressing button is formed with a locating hole 423 for pivotally connecting with the handle 4 by a pin member 424. The second end of the pressing button 42 can be depressed about the pin member 424 to make the stopper block 421 of the first end insert into or detach from the first or second locating hole 35, 36 of the saw blade seat 3. As shown in FIG. 7, the second end 43 of the handle 4 is disposed with a locating pin 44 formed with a groove 441 for engaging with a through hole 51 of the saw blade 5 rotated out of the saw blade seat 3.

Figure 6:
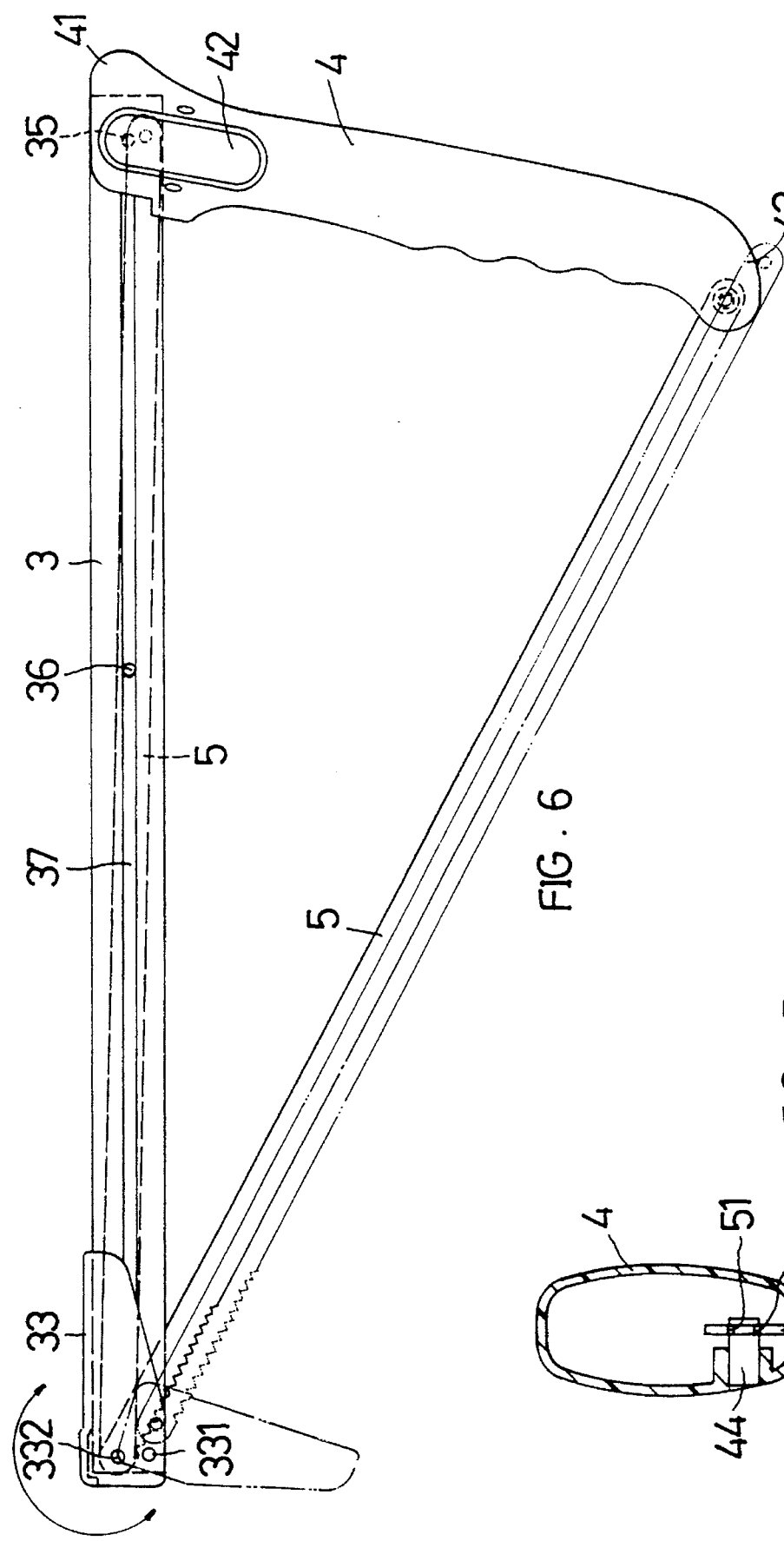
FIG. 6 is a side assembled view of the first embodiment of the present invention in an unfolded state.

Please refer to FIGS. 6 and 7. The locating member 42 is depressed to make the stopper block 421 separate from the second locating hole 36. At this time, the handle 4 can be moved along the slide channel 37 toward the second end 34 of the saw blade seat 3. When the stopper block 421 is inserted into the first locating hole 35, at least one of the saw blades 5 can be pulled out or rotated out of the saw blade seat 3 by the user. With regard to the remaining saw blades 5, they can be pushed back into the saw blade seat 3. Then, the handle 4 is downward pivoted together with the saw blade seat 3. Thus, an angle of approximately 90 degrees between the handle 4 and the saw blade seat 3 is formed. At this time, the remaining saw blades 5 are stopped by the handle 4.

Then the rotary cover 33 is rotated to reduce the space between the through hole 51 of the outward rotated saw blade 5 and the locating pin 44 of the second end 43 of the handle 4 so as to fit the saw blade 5 around the groove 441 of the locating pin 44. Then the rotary cover 33 is reversely rotated, making the eccentric pin member 332 more spaced away from the locating pin 44 so as to tension the saw blade 5. Therefore, two ends of the saw blade 5 are respectively connected to the first end 32 of the saw blade seat 3 and the second end 43 of the handle 4 to form a bow saw in working state (unfolded state).

Figure 8:
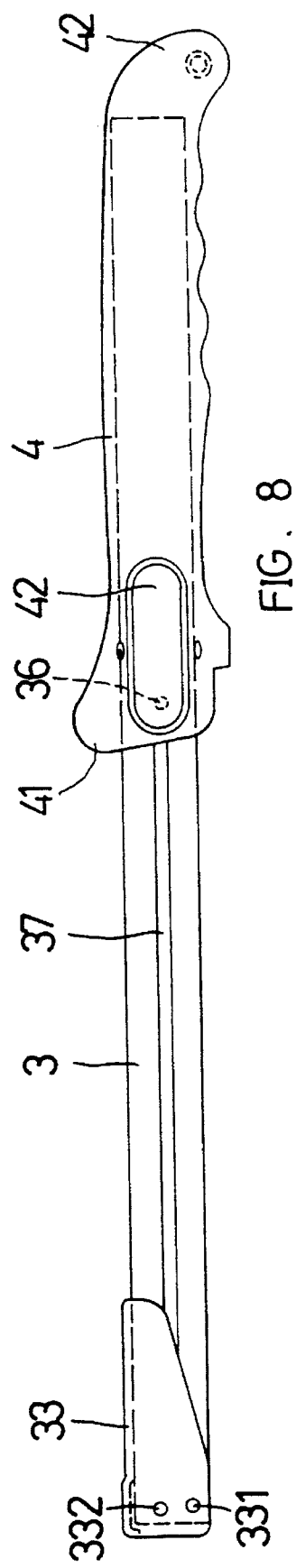
FIG. 8 is a side assembled view of the first embodiment of the present invention in a folded state.
Figure 9:
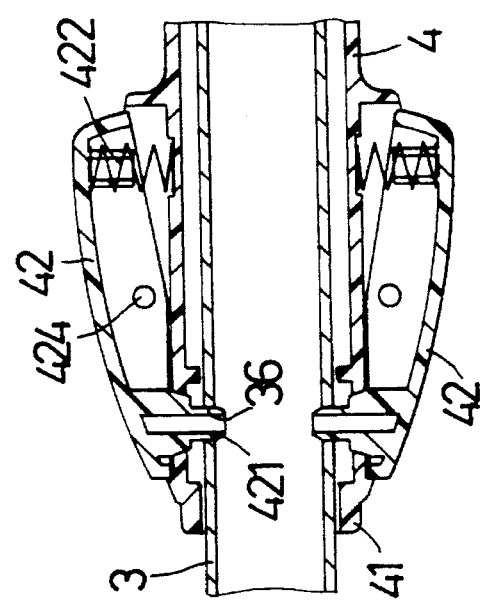
FIG. 9 is a sectional view showing the first end of the handle of the embodiment of FIG. 8.

Please refer to FIGS. 8 and 9. When the bow saw is folded, the rotary cover 33 is rotated to reduce the distance between the through hole 51 of the saw blade 5 and the locating pin 44 of the second end 43 of the handle 4, whereby the through hole 51 can be separated from the locating pin 44 and the handle 4 can be rotated to be positioned on the same axis as the saw blade seat 3. Then the saw blade 5 is rotated back into the saw blade seat 3 and the locating member 42 is depressed to make the stopper block 421 separated from the first locating hole 35. Then the saw blade seat 3 is pushed toward the handle 4 for inserting the stopper block 421 into the second locating hole 36. At this time, a section of the saw blade seat 3 from the second end 34 to the second locating hole 36 is received in the handle 4.

Figure 10:
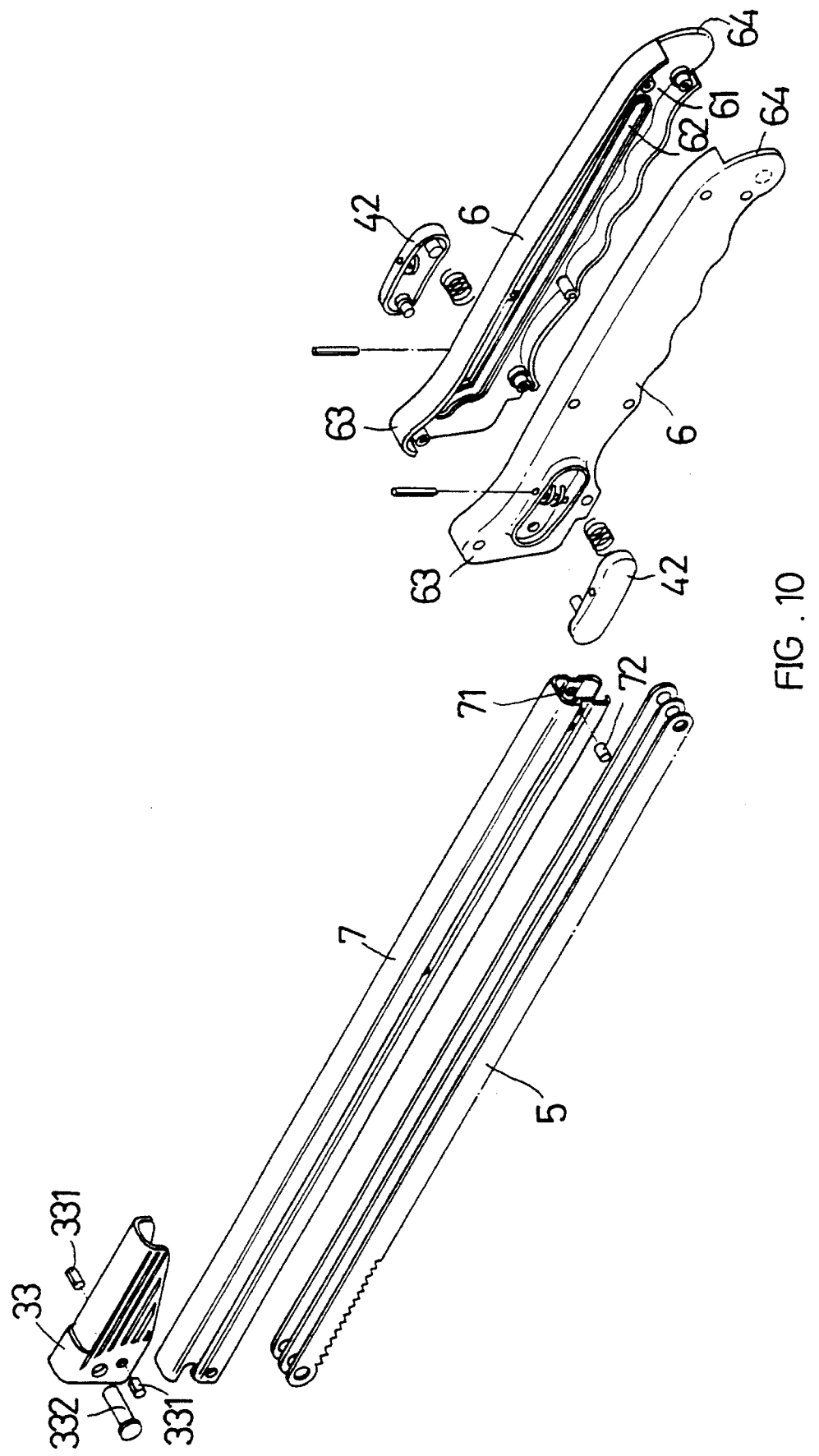
FIG. 10 is a perspective exploded view of a second embodiment of the present invention.
Figure 11:
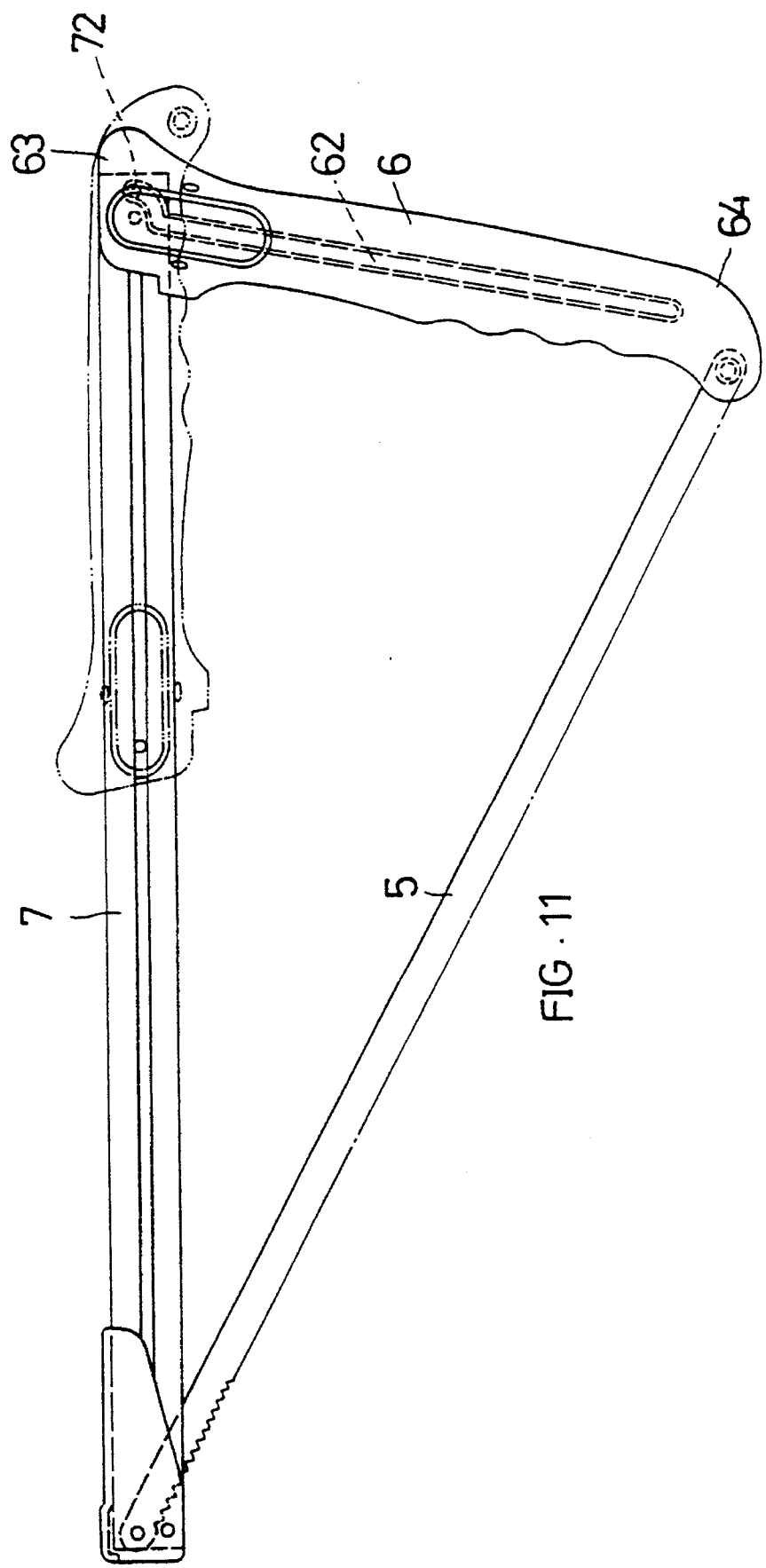
FIG. 11 is a side assembled view of the second embodiment of the present invention in an unfolded state.

Please refer to FIGS. 10 and 11. In a second embodiment of the present invention, the handle 6 is composed of two lateral halves. Each half has a mating face 61 formed with a guide channel 62. At a first end 63 of the handle 6, the guide channel 62 is arched. The guide channel 62 straightly extends from the arched end to a second end 64 of the handle 6. The second end 71 of the saw blade seat 7 is disposed with a locating member 72 for inserting into the guide channel 62 of the handle 6 and guiding the handle 6 to slide and rotate therein. The guide channel 62 also serves to reinforce the handle 6 at the pivot point.

Figure 12:
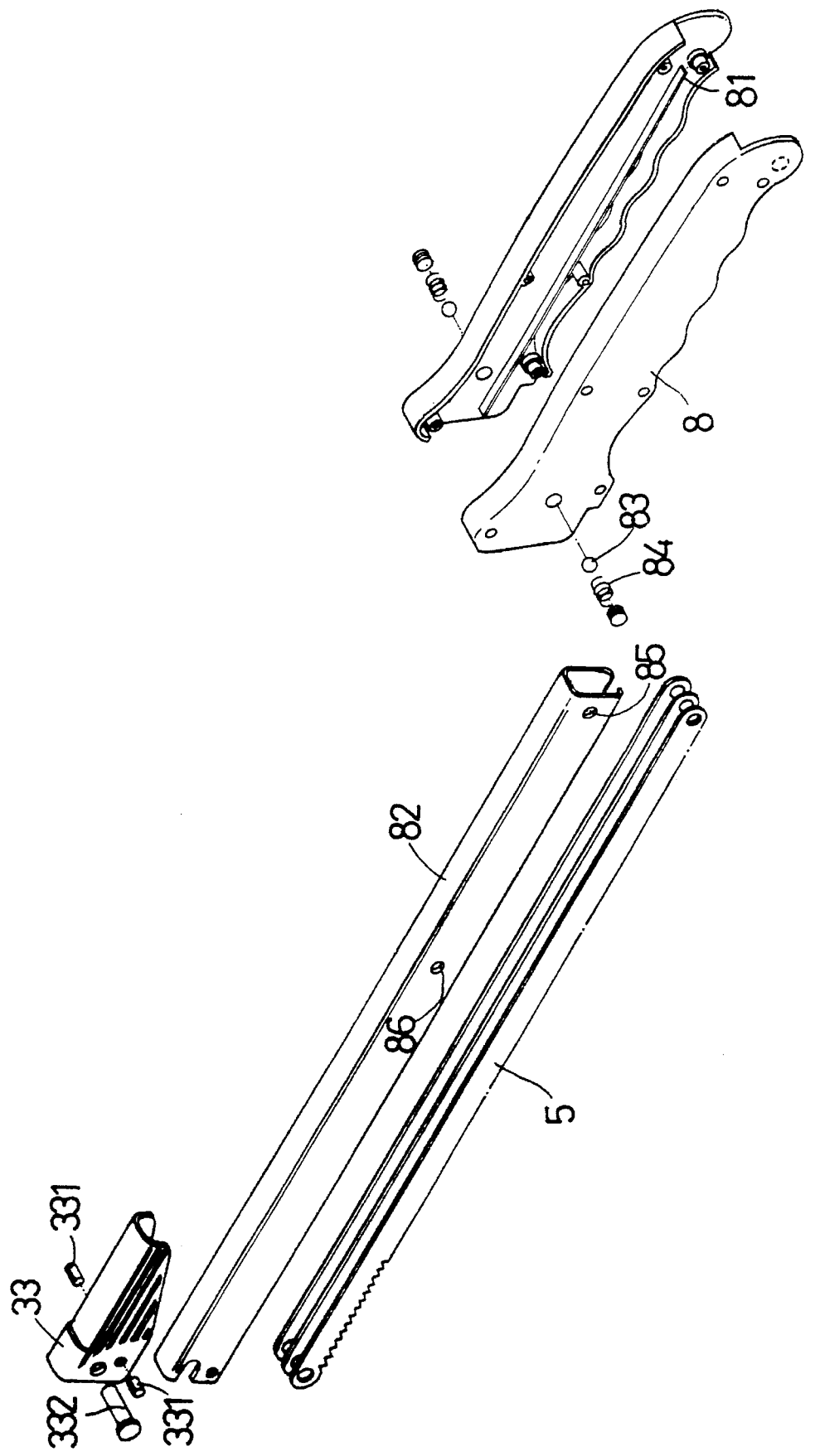
FIG. 12 is a perspective exploded view of a third embodiment of the present invention.

Please refer to FIG. 12. In a third embodiment of the present invention, the handle 8 is disposed with a rectangular guide channel 81 having a width equal to that of the saw blade seat 82. A locating member composed of a steel ball 83 and a spring 84 is inserted into a first and a second locating hole 85, 86 of the saw blade seat 82 for locating the handle 8 and the saw blade seat 82 and serving as a fulcrum of rotation of the handle 8. In this embodiment, the saw blade seat 82 is free from the slide channel 37 of the first embodiment. Instead, the rectangular guide channel 81 provides the longitudinal movement of the saw blade seat 82 and the handle 8.

Figure 13:
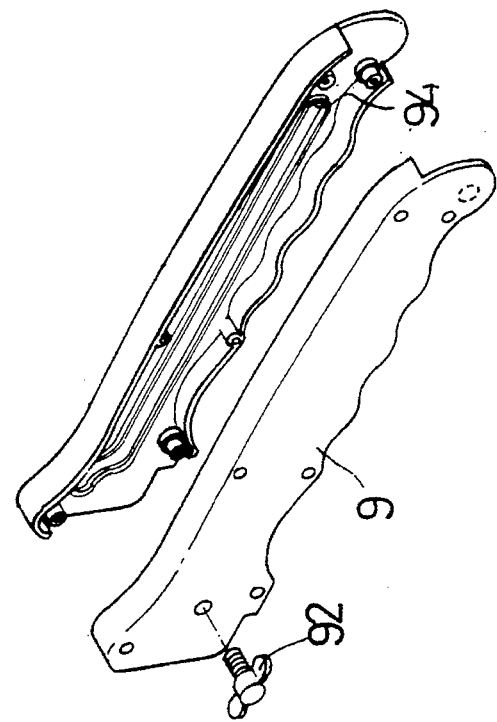
FIG. 13 is a perspective exploded view of a fourth embodiment of the present invention.
Figure 13:
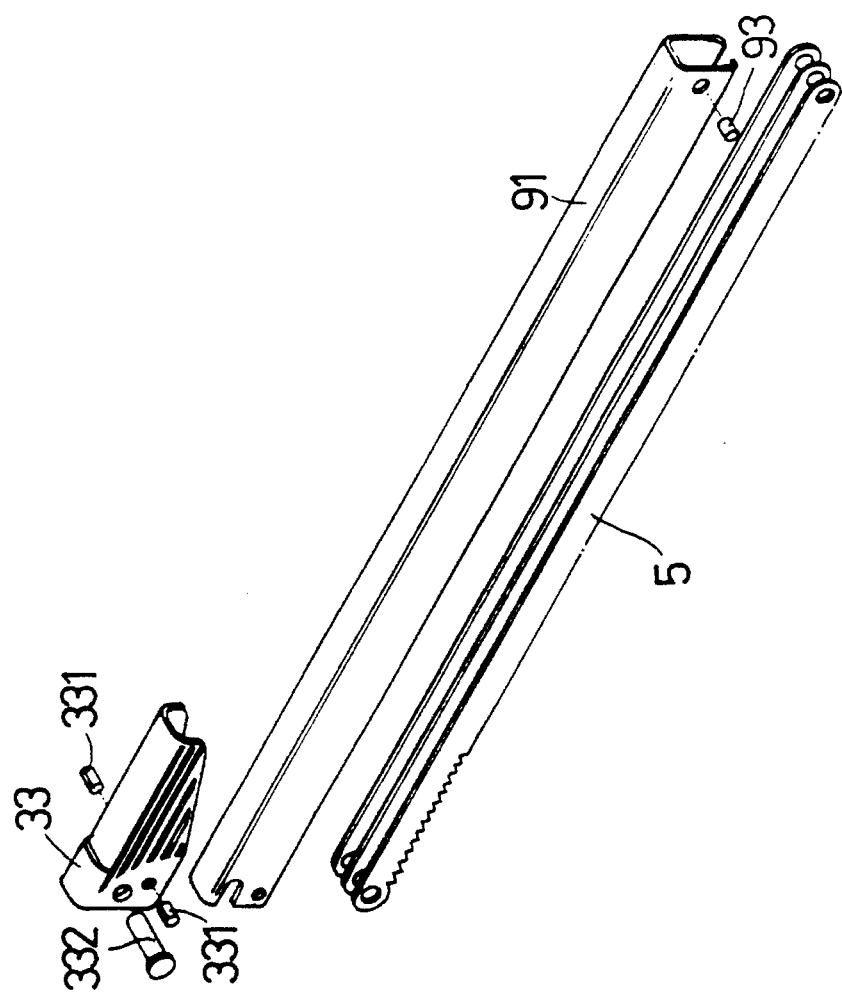

Please refer to FIG. 13. In a fourth embodiment of the present invention, the handle 9 and the saw blade seat 91 are substantially structurally identical to those of the second embodiment. However, the handle 9 is further formed with a second locating member made of a butterfly bolt 92. In addition, the saw blade seat 91 is free from any slide channel and locating hole. The function of the butterfly bolt 92 is to tighten and to locate the handle 9 on the saw blade seat 91. The locating member 93 of the saw blade seat 91 can be slidden within the guide channel 94 of the handle 9, permitting the handle 9 to be rotated relative to the saw blade seat 91.

The bow saw of the present invention has the following advantages:

1. The bow saw can be held with a comfortable feeling. The handle is formed with an opening at the first end for receiving the saw blade seat, rather than on one side of a holding section. Therefore, the handle can be held more comfortably.

2. The bow saw can be folded or unfolded more easily. The handle is provided with the locating member which also serves as a pivot shaft, so that the handle can be folded to a position substantially perpendicular to the saw blade seat in an unfolded state. The handle also can be linearly slidden along the slide channel to form a folded state.

3. The saw blade seat is able to receive multiple saw blades.

It is to be understood that the above description and drawings are only used for illustrating some embodiments of the present invention, not intended to limit the scope thereof. Any variation and derivation from the above description and drawings should be included in the scope of the present invention.

What is claimed is:

1. A bow saw comprising:

a saw blade seat having a first end and a second end, an eccentrically rotary cover being pivotally connected with the first end of the saw blade seat and at least one saw blade being pivotally connected with the rotary cover, the saw blade seat being formed with a longitudinal channel for receiving said at least one saw blade and having an opening on one side for said at least one saw blade to be rotated out of the saw blade seat;

a handle which is substantially an elongated hollow tube formed with waved external surface for easy grip, a first end of the handle being open, whereby the second end of the saw blade seat can be axially extended thereinto; and at least one locating member disposed near the first end of the handle for locating the second end of the saw blade seat, the handle being pivotable together with the saw blade seat contain an angle of about 90 degrees, permitting a second end of the handle to engage with the saw blade so as to form the bow saw in a working state, the locating member also serving to locate the saw blade seat when the handle axially receives a section of the saw blade seat.

2. A bow saw as claimed in claim 1, wherein the second end of the saw blade seat is formed with a first locating hole and a second locating hole is formed on the saw blade seat and spaced from the first locating hole by a length approximately equal to that of the handle, whereby the locating member can be inserted into the first locating hole, permitting the bow saw to be unfolded and the locating member can be alternatively inserted into the second locating hole, permitting the saw blade seat to be received and located in the handle.

3. A bow saw as claimed in claim 1, wherein the saw blade seat is formed with a slide channel along which the handle is axially slidable.

4. A bow saw as claimed in claim 1, wherein the locating member is a pressing button having a first end formed with a stopper block, a second end disposed with a resilient body and a middle section formed with a locating hole.

5. A bow saw as claimed in claim 1, wherein the locating member is composed of a steel ball and a spring.

6. A bow saw as claimed in claim 1, wherein the handle is disposed with a second locating member made of a butterfly bolt for tightening and locating the saw blade seat.

7. A bow saw as claimed in claim 1, wherein the handle is composed of two lateral halves each having a mating face formed with a guide channel, at a first end of the handle, the guide channel being arched, the guide channel straightly extending from the arched end to a second end of the handle, the second end of the saw blade seat being disposed with a locating member for inserting into the guide channels of the handle and guiding the handle to slide and rotate therein.

8. A bow saw as claimed in claim 1, wherein the second end of the handle is disposed with a locating pin for engaging with and locating the saw blade rotated out of the saw blade seat.

\* \* \* \* \*